(12) United States Patent
Kanie

(10) Patent No.: US 9,383,041 B2
(45) Date of Patent: Jul. 5, 2016

(54) ROTATION LIMITING TUBE FASTENER

(71) Applicant: ILLINOIS TOOL WORKS INC., Glenview, IL (US)

(72) Inventor: Hideki Kanie, Aichi (JP)

(73) Assignee: Illinois Tool Works Inc., Glenview, IL (US)

( * ) Notice: Subject to any disclaimer, the term of this patent is extended or adjusted under 35 U.S.C. 154(b) by 12 days.

(21) Appl. No.: 14/407,086

(22) PCT Filed: Jun. 11, 2013

(86) PCT No.: PCT/US2013/045278
§ 371 (c)(1),
(2) Date: Dec. 11, 2014

(87) PCT Pub. No.: WO2013/188473
PCT Pub. Date: Dec. 19, 2013

(65) Prior Publication Data
US 2015/0159779 A1 Jun. 11, 2015

Related U.S. Application Data

(60) Provisional application No. 61/658,643, filed on Jun. 12, 2012.

(51) Int. Cl.
*F16L 3/00* (2006.01)
*F16L 3/12* (2006.01)
*F16L 3/13* (2006.01)
*F16L 3/237* (2006.01)

(52) U.S. Cl.
CPC .............. *F16L 3/1218* (2013.01); *F16L 3/13* (2013.01); *F16L 3/237* (2013.01)

(58) Field of Classification Search
CPC ........ F16B 5/0685; F16B 3/127; F16B 21/02; F16L 3/13; F16L 3/237; F16L 3/1218
USPC .............. 138/106; 248/74.2, 71, 65, 73, 68.1; 24/457
See application file for complete search history.

(56) References Cited

U.S. PATENT DOCUMENTS

| | | | | |
|---|---|---|---|---|
| 3,944,177 | A * | 3/1976 | Yoda | F16L 3/08 248/73 |
| 4,195,807 | A * | 4/1980 | Llauge | F16L 3/10 174/175 |
| 4,450,605 | A * | 5/1984 | Schaty | F16L 3/13 24/129 R |
| 4,730,800 | A | 3/1988 | Engman | |
| 4,840,334 | A * | 6/1989 | Kikuchi | F16L 3/13 24/453 |
| 5,622,341 | A | 4/1997 | Stana | |

(Continued)

FOREIGN PATENT DOCUMENTS

| GB | 2279694 A | 1/1995 |
|---|---|---|
| GB | 2313581 A | 12/1997 |

(Continued)

OTHER PUBLICATIONS

ISR and WO for PCT/US2013/045278 mailed Oct. 16, 2013.

*Primary Examiner* — Patrick F Brinson
(74) *Attorney, Agent, or Firm* — Paul F. Donovan

(57) ABSTRACT

A fastener for holding tubes, fluid lines and the like is provided with a barb for deforming material on the surface of tubular fluid line held in the fastener, and a hollow adjacent the barb for receiving the deformed material.

20 Claims, 2 Drawing Sheets

(56) References Cited

U.S. PATENT DOCUMENTS

| | | | | |
|---|---|---|---|---|
| 5,739,474 | A * | 4/1998 | Bradley | H02G 3/26 174/135 |
| 5,890,685 | A | 4/1999 | Takahashi | |
| 6,216,987 | B1 * | 4/2001 | Fukuo | F16L 3/227 248/229.16 |
| 6,554,232 | B1 * | 4/2003 | Macris | F16B 5/0685 248/65 |
| 6,641,093 | B2 * | 11/2003 | Coudrais | F16L 3/13 248/68.1 |
| 6,969,832 | B1 * | 11/2005 | Daughtry, Sr. | F24D 3/141 219/531 |
| 7,145,112 | B1 * | 12/2006 | Daughtry, Sr. | F24D 3/141 219/521 |
| 7,188,815 | B2 * | 3/2007 | Peterson | F16B 21/088 24/297 |
| 7,240,880 | B2 * | 7/2007 | Benoit | F16L 3/13 24/555 |
| 2005/0082056 | A1 * | 4/2005 | Baxter | E21B 17/1085 166/241.6 |
| 2010/0261390 | A1 | 10/2010 | Gardner et al. | |
| 2013/0009019 | A1 | 1/2013 | Fukumoto | |

FOREIGN PATENT DOCUMENTS

| | | |
|---|---|---|
| WO | 9404861 A1 | 3/1994 |
| WO | 2011108243 A1 | 9/2011 |

* cited by examiner

ROTATION LIMITING TUBE FASTENER

CROSS-REFERENCE TO RELATED APPLICATIONS

The present application is a national phase of International Application No. PCT/US2013/045278 filed Jun. 11, 2013 and claims the benefits of U.S. Provisional Application Ser. No. 61/658,643 filed Jun. 12, 2012.

FIELD OF THE INVENTION

The present invention relates generally to fasteners or holding devices sometimes referred to as clips for holding fluid-conducting lines, tubes and the like in assemblies. More specifically, the invention relates to clips for holding fluid conducting lines such as fuel and brake lines in automobiles.

BACKGROUND OF THE INVENTION

Holding devices or fasteners, sometimes referred to as "clips," are used for routing items such as flexible tubing, rigid tubes, rods and the like in many different assemblies. Holding devices for this purpose are known to include some type of anchoring fixture for securing the holding device to the object on which it is used and a retainer structure or pocket that holds and secures the flexible tubing, rigid tube, rod or other item or thing that is to be held in position relative to the anchoring object. The anchoring fixture can be, for example, a threaded part, a deflectable self-locking leg for inserting into a hole, a mounting plate with holes for bolts, screws, rivets or other types of fasteners, a simple hole for receiving a stud or fixed fastener in the assembly, or any of a variety of other constructions that can be used to attach the holding device to the object, such as, for example an automobile.

Holding devices of the type described are used extensively in the automotive industry for routing fuel lines, brake lines, HVAC lines and the like, referred to herein as a "fluid conductor". The holding device must be robust to secure the fluid conductor in place. Once inserted into the holding device, the fluid conductor must be held firmly to prevent accidental dislodgment. A loose brake line or fuel line, for example, or other hose or fluid conductor in an automobile, can fail prematurely from mechanical stress placed thereon from movement and vibration resulting from its loosened condition. However, such failures can be created even if the fluid conductor is not dislodged from the holding device but is subjected to movement relative to the holding device. For example, when routing fuel lines, brake lines and the like in an automobile, the holding devices are secured to frame members, engine components and the like, and are configured to receive the fuel line or brake line in a close-fitting relationship. However, due to the significant vibration generated by an operating automobile, relative movement can occur between the holding device and the fuel or brake line. Relative movement between brake lines or fuel lines and their respective holding devices is undesirable not only because the relative movement can cause the brake line or fuel line to be detached, but also because the relative movement can cause fatigue and ultimately failure either at the point of movement or at couplings and the like upstream or downstream from the fastened location.

Accordingly, it is desirable and advantageous to provide a clip for holding fuel lines, brake lines and the like that provides fixed, relative positioning to ensure that the fuel line or brake line remains where routed with limited relative movement between the clip and the fuel or brake line.

A variety of designs are known for holding clips in automobiles. It is known to provide a pocket with a restricted inlet slightly narrower than the hose or tube diameter, requiring the hose or tube to be forced into the pocket. Some designs are known to include deflectable members at the top of the retention pocket, which can be deflected as the tube or hose is inserted. Once the tube or hose is properly positioned in the pocket, the arms spring back over the inlet area to the pocket. These designs are often referred to as "rabbit ear" designs because of the appearance of the deflectable arms. Both single rabbit ear and double rabbit ear constructions are known. A single rabbit ear design has an arm extending from one side of the inlet past the tube or pocket centerline. Such "over center" designs have had some success in holding tubes and hoses in place, but can be deflected to release the hose or tube if significant force is applied as the hose or tube is pulled from the pocket. So called "double rabbit ear" designs are intended to retain a tube or hose in the retention member via tangential force on the outer tube surface. These designs have opposed arms extending inwardly near to but not past the tube or pocket centerline.

Forces acting on a holding device and a fluid conductor held therein can be directed toward dislodging the fluid conductor from the holding device (so-called "pullout" force), can be directed toward sliding movement of the fluid conductor in the holding device or can be directed toward rotating the fluid conductor in the holding device. Often it is desirable to limit all such relative movements between a fluid conductor and a holding device for it, and known designs have achieved some but not total success in doing so. While some known holding devices have achieved success in limiting pullout force, limiting sliding movement and particularly limiting relative rotation have been more difficult to achieve in an inexpensive clip. Various types of protrusions or projections into the pockets formed in the holding devices have achieved some success by embedding into the fluid conductors held therein; however, such projections have embedded themselves only slightly into the fluid conductors, and have given way when subjected to significant rotational forces.

What is needed in the art is a holder for tubes, hoses and the like that adequately holds the item therein while substantially reducing the potential for unintended dislodgement, sliding movement and rotation, yet which can be manufactured inexpensively and used efficiently.

SUMMARY OF THE INVENTION

A tube fastener disclosed herein includes a pocket for holding a tube and at least one projection extending into the pocket and configured to deform material exposed on the surface of the tube if the tube is rotated relative to the pocket. A hollow is provided to receive the deformed material upon rotation of the tube, thereby further limiting rotation of the tube.

In one aspect of a form thereof, a fastener for holding an object is provided with an anchoring part for securing the fastener in an assembly; a holding part forming a pocket for capturing the object therein; a projection extending into the pocket, the projection configured to deform surface material of the object held in the pocket upon rotation of the object in the pocket; and a hollow adjacent the projection and positioned to receive the deformed material of the object as deformed by the projection upon rotation of the object in the pocket.

In another aspect of a form thereof, a tube assembly is provided with a tube having exposed surface material; and a fastener capturing the tube. The fastener includes an anchoring part for securing the fastener to an object; a holding part forming a pocket for capturing the tube therein; a projection extending into the pocket and configured to deform the tube held in the pocket upon rotation of the tube; and a hollow adjacent the projection and positioned to receive deformed material of the tube as deformed by the projection upon rotation of the tube in the pocket In a further aspect of a form thereof, a tube fastener holds a tube having a malleable material exposed on the surface thereof, and the tube fastener is provided with an anchoring part for securing the tube fastener in an assembly, a holding part forming a pocket for capturing the tube therein, a barb extending into the pocket and configured to deform the malleable material exposed on the surface of the tube upon rotation of the tube in the pocket, and a hollow adjacent the barb and positioned to receive a deformed portion of the malleable material as deformed by the barb upon rotation of the tube in the pocket.

Other features and advantages of the invention will become apparent to those skilled in the art upon review of the following detailed description, claims and drawings in which like numerals are used to designate like features.

Figure 1:
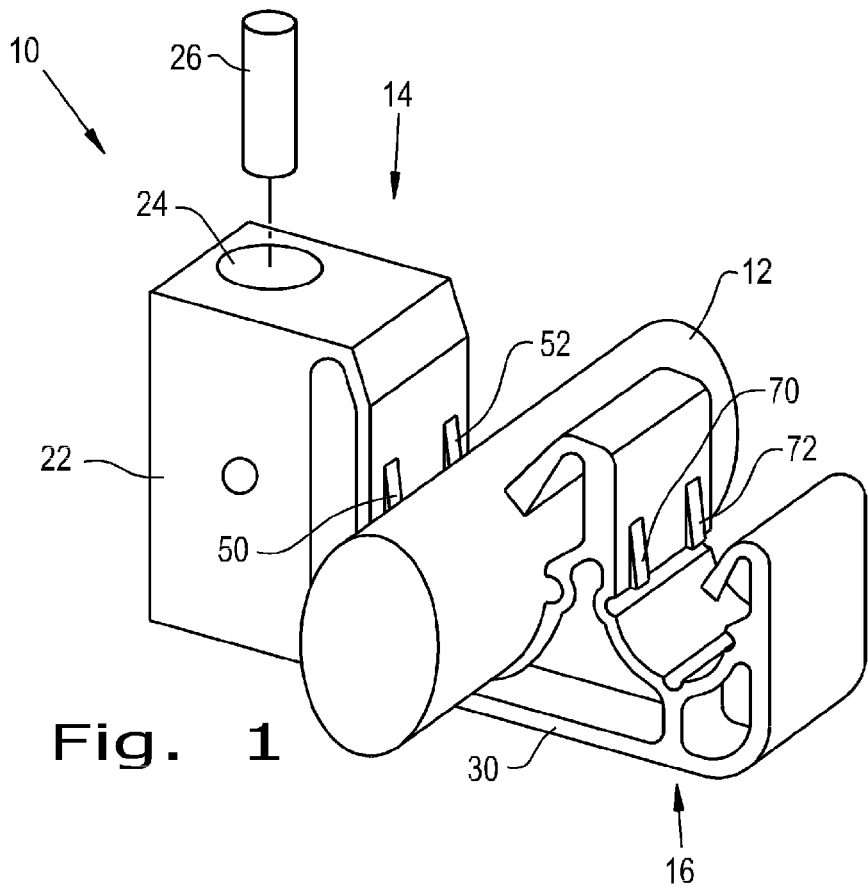
FIG. 1 is a perspective view of a tube fastener with a fluid conductor held therein.
Figure 2:
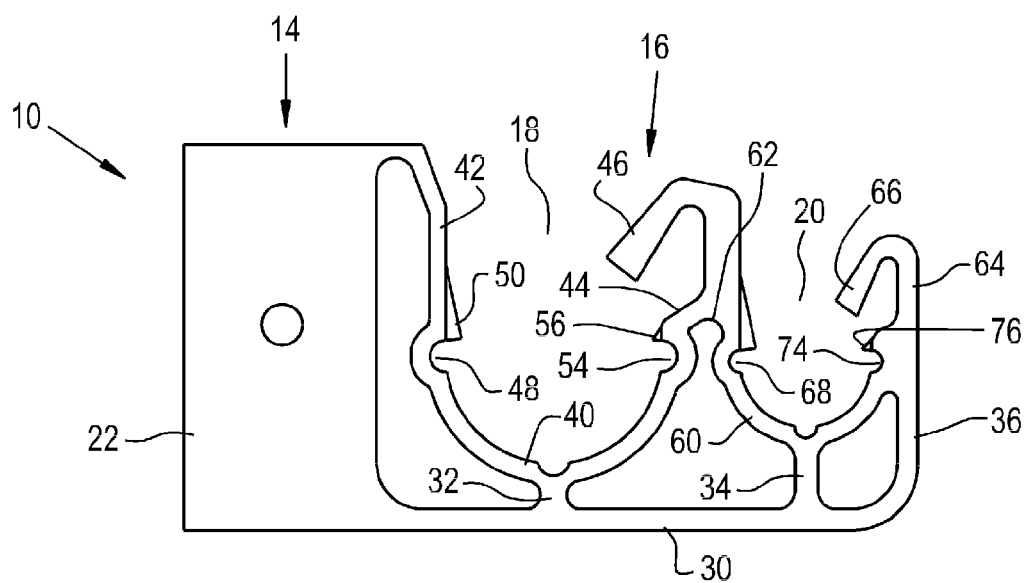
FIG. 2 is a an elevational view of the tube fastener shown in FIG. 1.
Figure 3:
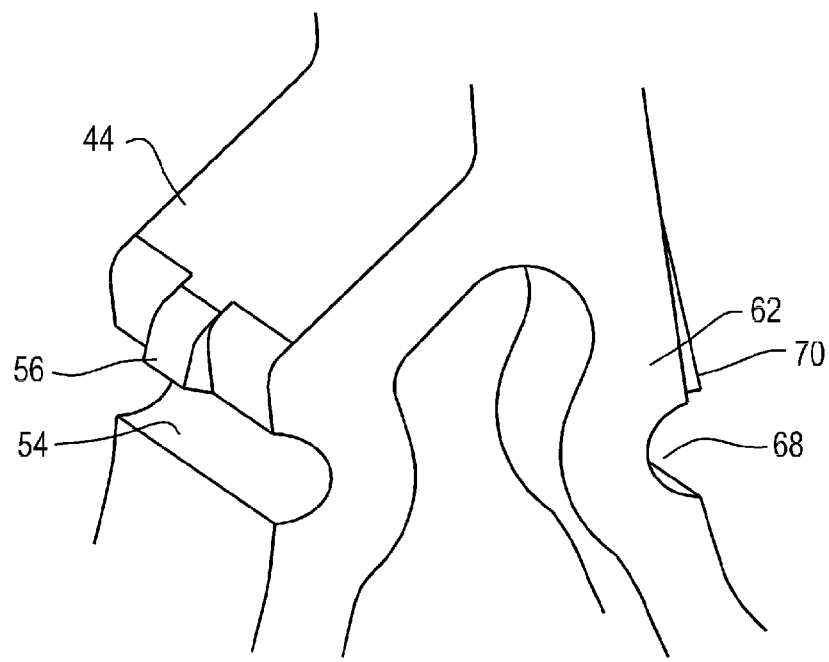
FIG. 3 is an enlarged fragmentary view of the tube fastener.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more particularly to the drawings, a tube assembly is shown including holding device or tube fastener 10 in which a fluid conductor in the form of a tube 12 is held. For example, and not limitation, tube 12 can be a brake line or fuel line in an automobile. Fastener 10 is a monolithic body of relatively rigid plastic material, such as nylon, forming an anchoring part 14 and a holding part 16. Holding part 16 includes first and second pockets 18, 20 configured for retaining tubes therein, a single tube 12 being shown in pocket 18.

It should be understood that the configuration shown for fastener 10 is merely exemplary, and other configurations also can be used. For example, anchoring part 14 is illustrated as a block 22 having a hole 24 therein configured for receiving a stud 26 secured to a component of an automobile. Other forms of anchoring part 14 can be used as described previously. Further, while holding part 16 is shown to include first and second pockets 18, 20 of different sizes for holding tubes of different sizes, it should be understood that holding part 16 may include pockets for holding tubes of the same size, and may include more than two pockets for holding tubes of multiple sizes or of the same size. Still further, holding part 16 also may include a single pocket for holding only one tube.

The exemplary configuration shown for holding part 16 includes a base 30 extending laterally from anchoring part 14 and beneath each of pockets 18, 20 which are adjacent one another. However, it should be understood that anchoring part 14 can also be arranged beneath holding part 16. First and second center supports 32, 34 are provided beneath pockets 18, 20 respectively. A side support 36 at the distal end of base 30 supports the outside area of pocket 20.

Pocket 18 is provided with a bottom 40 supported by center support 32 and opposed first and second arms 42, 44 extending from bottom 40 in spaced relationship to each other. Together with bottom 40, first and second arms 42, 44 define a cradle-like structure for receiving tube 12 therein. An inwardly projecting flange 46 is provided from the outer end of arm 44 to wedge against the outer surface of tube 12 and bias the tube toward and against first arm 42 and bottom 40. First arm 42 is provided with a cut-out or hollow 48 immediately below inwardly projecting protrusions 50, 52. Second arm 44 is provided with a cut-out or hollow 54 immediately beneath a bun or barb 56 projecting into pocket 18.

Pocket 20 is provided with a bottom 60 supported by center support 34 and opposed first and second arms 62, 64 extending from bottom 60 in spaced relationship to each other. In the exemplary embodiment, first arm 62 rises toward and joins second arm 44 as a single structure. Together with bottom 60, first and second arms 62, 64 define a cradle-like structure for receiving a tube therein (not shown). An inwardly projecting flange 66 is provided from the outer and of arm 64 to wedge against the outer surface of the tube held therein and bias the tube toward and against first arm 62 and bottom 60. First arm 62 is provided with a cut-out or hollow 68 immediately below inwardly projecting protrusions 70, 72. Second arm 64 is provided with a cut-out or hollow 74 immediately beneath a burr or barb 56 projecting into pocket 30.

Tube 12 is provided with malleable material exposed around the surface thereof, which can be the material forming tube 12 or can be a plastic coating 80 on a central cylindrical core 82. Plastic coating 80 is sufficiently malleable to be deformed by barbs 56, 76 and/or by protrusions 50, 52, 70, 72.

Figure 4:
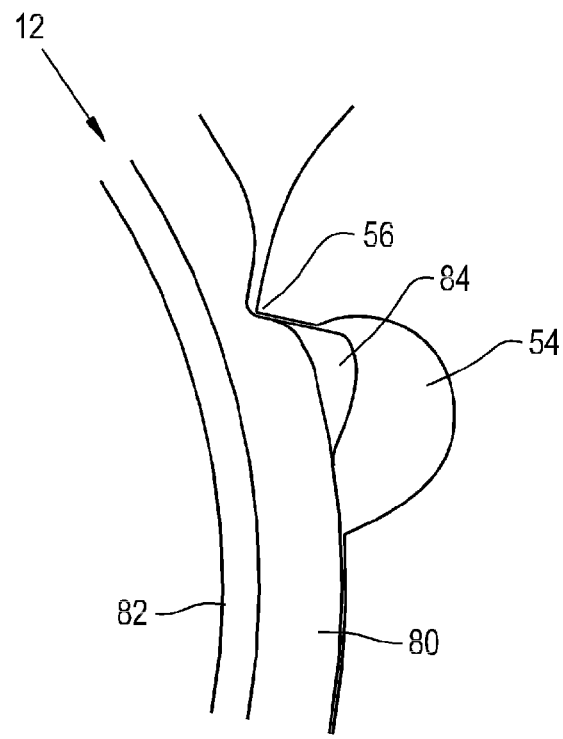
FIG. 4 is an enlarged fragmentary view of the tube fastener and a tube held therein.

Hollows 48, 54, 68, 74 provide open areas for receiving deformed material of plastic coating 80. Accordingly, in response to rotational forces applied to a tube held by tube fastener 10, barbs 56, 76 are caused to embed into plastic coating 80, curling a deformed segment of coating material into the cut-out 54, 74 immediately there below. FIG. 4 is a fragmentary enlarged view illustrating the manner in which barb 56 furrows into coating material 80, causing a deformed portion 84 of the coating material to be rolled into cut-out or hollow 54. The deformed material in the cut-out further resists rotational forces and the stronger the rotational force the greater amount of material that rolls into the cut-out with only minor rotation of the tube.

While the exemplary illustration shows a tube having a coating thereon, it should be understood that in some applications and uses for a tube fastener as disclosed herein the tube to be held may be of a material sufficiently malleable as to not require a special coating thereon. Further, while a single barb is shown in each pocket, it should be understood that multiple barbs can be provided on one side of the pocket or with one or several on opposite sides of the pocket. Protrusions 50, 52, 70, 72 also can be configured as bards so as to deform material exposed on the surface of the tube as described above with respect to barbs 56, 76. Alternatively additional barbs can be provided adjacent to the hollows on any of the arms. While primary effective in overcoming rotation, the barbs/protrusions also resist pull-out force and sliding.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A fastener for holding an object, said fastener comprising:
   an anchoring part for securing the fastener in an assembly;
   a holding part forming a pocket for capturing the object therein;
   a projection extending into the pocket, said projection configured to deform surface material of the object held in the pocket upon rotation of the object in the pocket; and
   a hollow adjacent the projection and positioned to receive the deformed material of the object as deformed by the projection upon rotation of the object in the pocket.

2. The fastener of claim 1, said projection comprising a barb.

3. The fastener of claim 1, including a plurality of said projections and a hollow adjacent each said projection.

4. The fastener of claim 3, said projections distributed on opposite sides of said pocket and said fastener including at least first and second hollows, one on each side of said pocket.

5. The fastener of claim 1, said holding part including first and second pockets, first and second projections extending into said first and second pockets, and first and second hollows adjacent said first and second projections.

6. The fastener of claim 5, said first and second projections comprising first and second barbs.

7. The fastener of claim 5, each of said first and second pockets including a plurality of said projections and a plurality of said hollows.

8. A tube assembly, comprising:
   a tube having exposed surface material; and
   a fastener capturing the tube, said fastener including:
      an anchoring part for securing the fastener to an object;
      a holding part forming a pocket for capturing the tube therein;
      a projection extending into the pocket, said projection configured to deform the tube held in the pocket upon rotation of the tube; and
      a hollow adjacent the projection and positioned to receive deformed material of the tube as deformed by the projection upon rotation of the tube in the pocket.

9. The assembly of claim 8, said tube including a cylinder and a coating on the cylinder, said coating being of sufficiently malleable material to be deformed by said projection upon rotation of said tube in said pocket.

10. The assembly of claim 8, said projection comprising a barb.

11. The assembly of claim 10, said tube including a cylinder and a coating on the cylinder, said coating being of sufficiently malleable material to be deformed by said barb upon rotation of said tube in said pocket.

12. The assembly of claim 8, said fastener including at least first and second projections on opposite sides of said pocket, and first and second hollows adjacent said first and second projections.

13. The assembly of claim 12, said tube including a cylinder and a coating on the cylinder, said coating being of sufficiently malleable material to be deformed by said projections upon rotation of said tube in said pocket.

14. The assembly of claim 8, said holding part defining a second pocket having a second projection extending into the second pocket and a second hollow disposed adjacent the second projection.

15. The assembly of claim 8, said pocket having a bottom and first and second arms extending from said bottom in opposed spaced relation, said projection and said a hollow disposed on one of said first and second arms, a second projection being a barb projecting into said pocket from the other of said first and second arms and a second hollow disposed adjacent said barb.

16. A tube fastener holding a tube, the tube having a malleable material exposed on the surface thereof, said tube fastener comprising:
   an anchoring part for securing the tube fastener in an assembly;
   a holding part forming a pocket for capturing the tube therein;
   a barb extending into the pocket, said barb configured to deform the malleable material exposed on the surface of the tube upon rotation of the tube in the pocket; and
   a hollow adjacent the barb and positioned to receive a deformed portion of the malleable material as deformed by the barb upon rotation of the tube in the pocket.

17. The tube fastener of claim 16, said pocket including a bottom and opposed first and second arms, said barb disposed on one of said first and second arms along with said hollow, the other of said first and second arms including a protrusion extending into the pocket and a second hollow disposed adjacent the protrusion.

18. The tube fastener of claim 17, said holding part defining a second pocket having a second barb extending into the second pocket and a third hollow disposed adjacent the second barb.

19. The tube fastener of claim 16, said holding part defining a second pocket having a second barb extending into the second pocket and a second hollow disposed adjacent the second barb.

20. The tube fastener of claim 16, said hollow containing a deformed portion of the malleable material.

\* \* \* \* \*